United States Patent
Ito

(10) Patent No.: US 6,597,819 B1
(45) Date of Patent: Jul. 22, 2003

(54) METHOD, APPARATUS AND RECORDING MEDIUM FOR INTERPOLATION OPERATION

(75) Inventor: Wataru Ito, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/409,664

(22) Filed: Sep. 30, 1999

(30) Foreign Application Priority Data

Sep. 30, 1998 (JP) .......................................... 10-277710
Apr. 22, 1999 (JP) .......................................... 11-115042

(51) Int. Cl.⁷ .................................................. G06K 9/32
(52) U.S. Cl. ...................................... 382/300; 358/525
(58) Field of Search ................................ 382/300, 298, 382/299; 708/290; 348/441; 358/525

(56) References Cited

U.S. PATENT DOCUMENTS 5,920,659 A * 7/1999 Iverson et al. ............. 382/298
5,953,691 A * 9/1999 Mills ......................... 702/198

* cited by examiner

Primary Examiner—Yon J. Couso
(74) Attorney, Agent, or Firm—Birch, Stewart, Kolasch & Birch, LLP

(57) ABSTRACT

An interpolated image having high sharpness and no artifacts at a portion of changing transparency can be obtained for image data having the α channel. Upon interpolating original image data SO, whether or not the value of the α channel is 1 for all 4×4 pixels surrounding an interpolation point is judged by judging means. When the value is judged to be 1 for all pixels, the area is judged to be completely opaque and a high degree interpolation operation enabling sharpness increase is carried out by high degree interpolation operation means. If the value is judged to be not 1 for all pixels, a linear interpolation operation such as the pre-multiplied α method is carried out by linear interpolation operation means in order not to create an artifact. The interpolated image data obtained in this manner are composed together with combining image data by image composition controlling means to obtain composite image data.

15 Claims, 8 Drawing Sheets

| R=G=B=255 | R=G=B=33 | R=G=B=33 |
| $a=0$ | $a=1$ | $a=1$ |

R=G=B=255    R=G=B=33    R=G=B=33

METHOD, APPARATUS AND RECORDING MEDIUM FOR INTERPOLATION OPERATION

BACKGROUND OF THE INVENTION

1. Field of the Invention

The present invention relates to a method and an apparatus for carrying out an interpolation operation on original image data comprising pixels each including a channel representing transparency and channels representing color or density, and also to a computer-readable recording medium storing a program to cause a computer to execute the interpolation operation method.

2. Description of the Related Art

Enlargement reproduction or reduction reproduction of image data obtained by photoelectrically reading an image recorded on a film or by photographing a subject with a digital camera has been carried out. Such enlargement or reduction of image data has been carried out by obtaining interpolated image data having pixel spacing different from that of original image data through an interpolation operation on the original image data. As the interpolation operation, high-degree interpolation operations, such as the cubic spline interpolation operation generating a sharp interpolated image and the B spline interpolation operation generating a comparatively smooth interpolated image, or linear interpolation operations are used.

Meanwhile, image data are RGB or RGBα data defined as a 3-channel or 4-channel image respectively. Especially, the α channel in the RGBα image data defines transparency at a pixel in the original image represented by the image data. Depending on the value of the α channel, a composition ratio of the image data and a mount image which the image data are printed on or inserted in is changed. More specifically, the smaller the a value is, the more the mount becomes visible through the image. By changing the α channel value near the border between the original image and the mount to a small value, the image is composed with the mount as if the image is blended into the mount. For example, as shown in FIG. 6, when pixels each having values of R=G=B=255 (α=0), R=G=B=33 (α=1), and R=G=B=33 (α=1) are pasted on a black mount (R=G=B=0), the pixel values are changed according to the α channel value, based on the following Equation (1) below:

$$P = F2 \times (1-\alpha) + F1 \times \alpha \qquad (1)$$

where P is a value of a pixel pasted on the mount,

F1 is a value of a pixel of the image to be pasted on the mount, and

F2 is a value of a pixel of the mount at the position corresponding to the pixel value of the image.

As shown in FIG. 7, the image is then pasted on the mount in such a manner that only the pixels whose α value is 1 remain.

As has been described above, when the transparency is defined by the α channel, an image can be blended into a mount and the image and the mount can be composed together in a more natural manner.

It is also possible to enlarge or reduce an original image by carrying out an interpolation operation on image data having the α channel. For simplicity, let's take an example of enlarging image data by 2 through linear interpolation. The RGB values and the α channel value of the pixels shown in FIG. 6 are RGB=255 (α=0) (hereinafter, for simplicity, an expression "RGB=n" is used for the case of R=G=B=n where n is a number), RGB=144 (α=0.5), RGB=33 (α=1), RGB=33 (α=1), and RGB=33 (α=1), as shown in FIG. 8. In FIG. 8, the pixels augmented as a result of interpolation are shown as black dots. When the image data interpolated as has been described above are pasted on the black mount, the values of each pixel are changed according to the α channel value, based on Equation (1), and an image having the pixel values shown in FIG. 9 is pasted onto the mount.

However, when the image data having the α channel are interpolated, a portion where pixel values are larger than those of surrounding pixels, such as RGB=72, is generated at a border where the α channel value changes from 1 to 0, as shown in FIG. 9. As a result, a white streak is generated at the border between the pasted image and the mount. In order to prevent such white streaks from occurring, a linear interpolation method (hereinafter called the pre-multiplied α method) can be used.

In the pre-multiplied α method, the RGB values of each pixel are multiplied by the α channel value in advance. In other words, the second term of Equation (1) is found in advance. The 4 channels, namely α, αR, αG, and αB are then linearly interpolated In this method, the 3 values (αR, αG, and αB) of the pixel shown in FIG. 6 become RGB=0, RGB=33, and RGB=33, as shown in FIG. 10. When enlargement by 2 is carried out, the values become RGB=0 (α=0), RGB=16 (α=0.5), RGB=33 (α=1), RGB=33 (α=1), and RGB=33 (α=1). When an image having such pixel values is pasted onto the same black mount, no white streak is generated near the border where the α value changes from 1 to 0, since RGB=0 (α=0), RGB=16 (α=0.5), RGB=33 (α=1), RGB=33 (α=1), and RGB=33 (α=1), as shown in FIG. 11.

As has been described above, interpolation of image data having the α channel can be carried out easily by adopting linear interpolation, although linear interpolation has a drawback such that it tends to create a blurry interpolated image. Therefore, in order to increase sharpness, high-degree interpolation operations such as the cubic spline interpolation and the B spline interpolation are carried out on the image data having the α channel.

In the case where a high-degree interpolation operation is carried out in order to improve sharpness as has been described above, image data after interpolation (interpolated image data) do not have monotonically increasing or decreasing data as in the case of linear interpolation. However, the interpolated image data have more or less over shoot or under shoot occurring at a border such as an edge included in the image. Such over shoot or under shoot brings preferable visual effects to an image. However, if a high-degree interpolation operation is carried out on image data having the α channel, an image of the mount can be seen at some portions where the α channel value changes, or cannot be seen at other portions where the α channel value also changes. In this manner, an artifact is created. In this case, it is possible to carry out a linear interpolation operation only on the α channel and to carry out a high-degree interpolation operation on the other channels. However, the α channel would not be harmonious with the other channels in this case and an artifact is also created.

SUMMARY OF THE INVENTION

The present invention has been created based on consideration of the above problems. An object of the present invention is to provide a method and an apparatus for obtaining an interpolated image having high sharpness and no artifact from image data having the α channel, and a computer-readable recording medium storing a program to cause a computer to execute the interpolation operation method.

An interpolation operation method of the present invention is an interpolation operation method of finding interpolated image data having pixel spacing different from that of original image data by interpolating the original image data comprising pixels each having a channel representing transparency and channels representing color or density, and the interpolation operation method comprises the steps of:

carrying out an interpolation operation different for each interpolation point, depending on the values of the channel representing transparency of all pixels in a predetermined area surrounding the interpolation point in the original image represented by the original image data.

The "channel representing transparency" means the $\alpha$ channel described above. The case of $\alpha$ being 1 means complete opaqueness while the case of $\alpha$ being 0 means complete transparency. The value of the $\alpha$ channel is represented in the same manner as the bit number of the channels representing the color or density, and 0–1 is mapped as 0–255 in the case of 8-bit data.

The "channels representing the color or density" mean R, G, and B channels when each pixel is represented by RGB. Alternatively, the channels mean the hue channel, the saturation channel, and the lightness channel when each pixel is represented by hue, saturation, and lightness.

It is preferable for the interpolation operation method of the present invention to judge whether or not the value of the channel representing transparency indicates complete opaqueness for all pixels in the predetermined area surrounding the interpolation point so that a high degree interpolation operation is carried out on the interpolation point, based on the pixel values in the predetermined area, when the judgment result is affirmative and a linear interpolation operation is carried out on the interpolation point, based on the pixel values in the predetermined area, when the judgment result is negative.

In this case, it is preferable for the linear interpolation operation to be carried out after multiplied pixel values are found by multiplying the values of each pixel in the predetermined area and the value of the channel representing transparency at the pixel.

The phrase stating that "judgment result is affirmative" means the case where the value of the channel representing transparency shows complete opaqueness for all pixels in the predetermined area, and means the case of the $\alpha$ channel value being 1 for all pixels if $\alpha=1$ indicates complete opaqueness. On the other hand, the phrase stating that "judgment result is negative" means the case where the value of the channel representing transparency does not show complete opaqueness for at least one pixel in the predetermined area, and means the case of the $\alpha$ channel value being not 1 for at least one pixel if $\alpha=1$ shows complete opaqueness.

The "high degree interpolation operation" means interpolation operations such as the cubic spline or B spline interpolation operations.

Furthermore, it is preferable for the interpolation operation method of the present invention to comprise the steps of:

calculating an index value representing opaqueness of the predetermined area surrounding the interpolation point, based on the values of the channel representing transparency of all pixels in the predetermined area;

carrying out a high degree interpolation operation on the interpolation point, based on the values of the pixels in the predetermined area, if the index value shows complete opaqueness; and carrying out a linear interpolation operation on the interpolation point, based on the values of the pixels in the predetermined area, if the index value shows a state other then complete opaqueness.

As the "index value representing opaqueness", a product obtained by multiplying the values of the channel representing transparency in the predetermined area surrounding the interpolation point, or an average of the values of the channel representing transparency in the predetermined area can be used, for example. If $\alpha=1$ shows complete opaqueness and $\alpha=0$ means complete transparency for example, the product or the average, that is, the index value, shows complete opaqueness when it is 1, and shows transparency or semi-transparency otherwise.

Moreover, it is preferable for the interpolation operation method of the present invention to comprise the steps of:

calculating an index value indicating opaqueness of the predetermined area surrounding the interpolation point, based on the values of the channel representing transparency of all pixels in the predetermined area; and setting an interpolation coefficient used for carrying out an interpolation operation on the interpolation point, based on the calculated index value; and carrying out the interpolation operation based on the interpolation coefficient having been set.

"Setting an interpolation coefficient based on the index value" means setting the interpolation coefficient to be suitable for high degree interpolation if the index value shows 1 meaning complete opaqueness while setting the interpolation coefficient to be suitable for linear interpolation if the index value shows a value other than 1 meaning transparency or semi-transparency as has been described above, for example.

An interpolation operation apparatus of the present invention is an interpolation operation apparatus for finding interpolated image data having pixel spacing different from that of original image data by interpolating the original image data comprising pixels each having a channel representing transparency and channels representing color or density, and the apparatus comprises interpolation operation means for carrying out an interpolation operation different for each interpolation point, based on the values of the channel representing transparency of all pixels in a predetermined area surrounding the interpolation point in an original image represented by the original image data.

It is preferable for the interpolation operation means in the interpolation operation apparatus of the present invention to comprise:

judging means for judging whether or not the value of the channel representing transparency shows complete opaqueness for all pixels in the predetermined area surrounding the interpolation point;

high degree interpolation means for carrying out a high degree interpolation operation on the interpolation point, based on the values of the pixels in the predetermined area, if the judgment result obtained by the judging means is affirmative; and linear interpolation operation means for carrying out a linear interpolation operation on the interpolation point, based on the values of the pixels in the predetermined area, if the judgment result obtained by the judging means is negative.

In this case, it is preferable for the linear interpolation operation means to carry out the interpolation operation after multiplied pixel values are obtained by multiplying the values of each pixel in the predetermined area and the value of the channel representing transparency at the pixel.

In the interpolation operation apparatus of the present invention, it is preferable for the interpolation operation means to comprise:

- index value calculating means for calculating an index value indicating opaqueness of the predetermined area surrounding the interpolation point, based on the values of the channel representing transparency of all pixels in the predetermined area;
- high degree interpolation operation means for carrying out a high degree interpolation operation on the interpolation point, based on the values of the pixels in the predetermined area, if the index value indicates complete opaqueness; and
- linear operation interpolation means for carrying out a linear interpolation operation on the interpolation point, based on the values of the pixels in the predetermined area, if the index value shows a state other than complete opaqueness.

Furthermore, it is also preferable for the interpolation operation means of the interpolation operation apparatus of the present invention to comprise:

- index value calculating means for calculating an index value indicating opaqueness of the predetermined area for all pixels in the predetermined area surrounding the interpolation point, based on the value of the channel representing transparency; and
- interpolation coefficient setting means for setting an interpolation coefficient for an interpolation operation to be carried out on the interpolation point, based on the index value calculated by the index value calculating means, and to carry out the interpolation operation based on the interpolation coefficient having been set.

The interpolation operation method of the present invention may be provided as a program stored in a computer-readable recording medium to cause a computer to execute the interpolation operation method.

According to the present invention, an interpolation operation which is different for each interpolation point is carried out on the interpolation point, based on the value of the channel representing transparency of all pixels in the predetermined area surrounding the interpolation point. Therefore, depending on transparency of the predetermined area surrounding the interpolation point, an appropriate interpolation operation such as a high degree interpolation operation enabling sharpness to be improved or a linear interpolation operation carried out easily although having low sharpness can be carried out on the interpolation point.

By carrying out a high degree interpolation operation on the interpolation point if the value of the channel representing transparency shows complete opaqueness for all pixels in the predetermined area surrounding the interpolation point and otherwise by carrying out a linear interpolation operation on the interpolation point, an interpolated image having high sharpness for a completely opaque area in an original image can be obtained, since a high degree interpolation operation can improve sharpness of the interpolated image compared to a linear interpolation operation. Meanwhile, for an area which is not completely opaque, that is, for an area which is transparent or semi-transparent, a linear interpolation operation is carried out and no artifact due to over shoot or under shoot which would be created by a high degree interpolation operation occurs. Therefore, an interpolated image having no artifact and high sharpness even at a border having changing transparency can be obtained. In this case, the image becomes blurry at the portion having changing transparency. However, a blurry original image does not cause any visual problems, since the portion having the changing transparency is blended into the mount.

In the case where a linear interpolation operation is carried out based on the multiplied pixel values obtained by multiplying the values of the pixels in the predetermined area and the value of the channel representing transparency, the values of the original image data in the portion having changing transparency do not change unnaturally, and an interpolated image having more naturally changing transparency can be obtained.

Furthermore, by calculating the index value representing opaqueness of the predetermined area based on the value of the channel representing transparency of all pixels in the predetermined area surrounding the interpolation point and by carrying out a high degree interpolation operation or a linear interpolation operation on the interpolation point if the index value indicates complete opaqueness or a state other than complete opaqueness respectively, an interpolated image having high sharpness for a completely opaque area in the original image and having no artifacts due to over shoot or under shoot which would be caused by a high degree interpolation operation in a transparent or semi-transparent area can be obtained. Therefore, an interpolated image having no artifacts and high sharpness even in an area having changing transparency can be obtained.

Moreover, by calculating the index value indicating opaqueness of the predetermined area, based on the value of the channel representing transparency of all pixels in the predetermined area surrounding the interpolation point, and by setting the interpolation coefficient for an interpolation operation based on the index value, the high degree interpolation coefficient for high sharpness or the linear interpolation operation coefficient for not creating artifacts and for easy operation execution can be set depending on opaqueness of the predetermined area surrounding the interpolation point. In this manner, an appropriate interpolation operation can be carried out in accordance with the opaqueness of the area surrounding the interpolation point.

DESCRIPTION OF THE PREFERRED EMBODIMENTS

Hereinafter, embodiments of the present invention will be explained with reference to the accompanying drawings.

Figure 1:
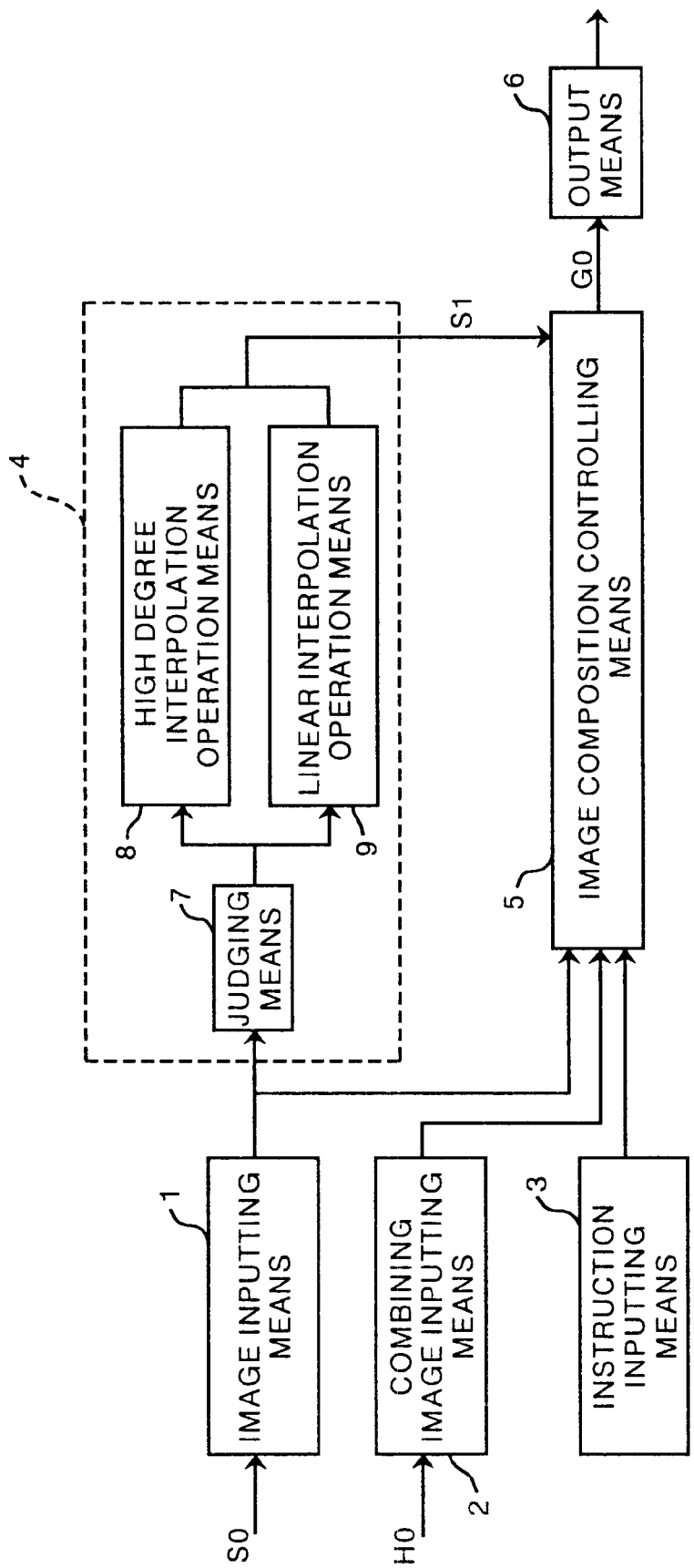
FIG. 1 is a block diagram showing an outline configuration of an image composing system adopting an interpolation operation apparatus according to a first embodiment of the present invention.

FIG. 1 is a block diagram showing an outline configuration of an image composing system adopting an interpolation operation apparatus according to a first embodiment of the present invention. As shown in FIG. 1, the image composing system using the interpolation operation apparatus according to the first embodiment has image inputting means 1 for inputting original image data S0 comprising pixels each including 4 channels namely R, G, B and α representing transparency, combining image inputting means 2 for inputting combining image data H0 representing an image to be composed with the original image data S0, instruction inputting means 3 for inputting an instruction for image composition and the like, an interpolation operation apparatus 4 according to this embodiment for obtaining interpolated image data S1 by carrying out an interpolation operation on the original image data S0, image composition controlling means 5 for controlling the interpolation operation apparatus 4 and for carrying out image composition to obtain composite image data G0, and output means 6 for outputting the composite image data G0 to an external device.

The interpolation operation apparatus 4 comprises judging means 7 for judging, at the time of carrying out an interpolation operation on the original image data S0 as will be explained later, whether or not the value of the α channel is 1 for all pixels in a predetermined area surrounding an interpolation point, high degree interpolation operation means 8 for carrying out a high degree interpolation operation on the original image data S0 in a predetermined area, based on the judgment result from the judging means 7, and linear interpolation operation means 9 for carrying out a linear interpolation operation on the original image data S0 in a predetermined area, based on the judgment result from the judging means 7.

The image composition controlling means 5 judges necessity of enlargement, reduction, rotation and the like of the original image data S0, based on the instruction input from the instruction inputting means 3. If necessary, the image composition controlling means 5 determines the position of the interpolation point, and carries out an interpolation operation on the original image data S0 by controlling the interpolation operation apparatus 4. The interpolated image data S1 obtained by carrying out an interpolation operation on the original image data S0 and the combining image data H0 are composed with the interpolated image data S1 to obtain the composite image data G0.

The judging means 7 in the interpolation operation apparatus 4 judges whether or not the value of the α channel of a predetermined area of 4×4 pixels surrounding the interpolation point determined by the image composition controlling means 5 is 1 for all pixels. The value of the α channel means complete opaqueness when it is 1 and complete transparency when 0. When the value ranges from 0 to 1, the value indicates semi-transparency. Therefore, when the judgment as to whether the α channel value is 1 for all pixels in the predetermined area is affirmative, the original image is completely opaque in the predetermined area. Meanwhile, when the judgment is negative, it means at least one pixel is not completely opaque, that is, the pixel is transparent or semi-transparent. Practically, the value of the α channel is expressed as the bit number of the RGB channel, and a value ranging from 0 to 1 is mapped onto 0 to 255 in the case of 8-bit data.

The high degree interpolation operation means 8 carries out a high degree interpolation operation emphasizing sharpness, based on the values of the 4×4 pixels surrounding the interpolation point, when the judgment by the judging means 7 is affirmative. As the high degree interpolation operation, the cubic spline interpolation operation and the B spline interpolation operation described above can be listed, for example. Hereinafter, the cubic spline interpolation operation and the B spline interpolation operation will be explained.

Assume that the original image data S0 used in this embodiment are digital image data $S_{k-2}, S_{k-1}, S_k, S_{k+1}, S_{k+2}$ ... corresponding to sampling point s (pixels) $X_{k-2}, X_{k-1}, X_k, X_{k+1}, X_{k+2}$ ... laid out in one direction at an equal interval.

The cubic spline interpolation operation finds out the interpolation coefficients $c_{k-1}, c_k, c_{k+1}, \text{ and } c_{k+2}$ corresponding to interpolation data $Y_{k-1}, Y_k, Y_{k+1}$ and $Y_{k+2}$ in the following 3-degree cubic spline interpolation operation equation (2) representing interpolation data Y' at an interpolation point $X_p$ set between the original sampling points (pixels) $X_k$ and $X_{k+1}$:

$$Y'=c_{k-1}Y_{k-1}+c_kY_k+c_{k+1}Y_{k+1}+c_{k+2}Y_{k+2} \quad (2)$$

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

where t ($0 \leq t \leq 1$) shows a position of the interpolation point $X_p$ from the pixel $X_k$ toward the pixel $X_{k+1}$ when a grid interval is 1.

The B spline interpolation operation finds out interpolation coefficients $b_{k-1}, b_k, b_{k+1}$ and $b_{k+2}$ corresponding to the interpolation data $Y_{k-1}, Y_k, Y_{k+1}$ and $Y_{k+2}$ in the following 3-degree B spline interpolation operation equation (3) representing interpolation data Y' at the interpolation point $X_p$ set between the original sampling points (pixels) $X_k$ and $X_{k+1}$:

$$Y'=b_{k-1}Y_{k-1}+b_kY_k+b_{k+1}Y_{k+1}+b_{k+2}Y_{k+2} \quad (3)$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

where t ($0 \leq t \leq 1$) shows the position of the interpolation point $X_p$ from the pixel $X_k$ toward the pixel $X_{k+1}$ when the grid interval is 1. The interpolation operation apparatus 4 sets the coefficients $c_{k-1}$, $c_k$, $c_{k+1}$, and $c_{k+2}$ or $b_{k-1}$, $b_k$, $b_{k+1}$ and $b_{k+2}$ as parameters.

Since the area wherein the α channel value is 1 for all pixels is dealt with in the high degree interpolation operation, the α channel value for the interpolation point is assumed to be 1.

The linear interpolation operation means 9 carries out an interpolation operation on the predetermined area by using the pre-multiplied α method, when the judgment result from the judging means 7 is negative. The phrase stating that the judgment result from the judging means 7 is negative means that the interpolation point is at a border between a transparent area and an opaque area or in a complete transparent area. When a high degree interpolation operation is carried out on the border area especially, an artifact may be generated. Therefore, a linear interpolation operation is carried out in order not to create an artifact. More specifically, a linear interpolation operation is carried out after αR, αG, and αB values are found by multiplying the RGB values of the pixels in an area of 2×2 pixels near the interpolation point and the α value. In this case, the value of the α channel at the interpolation point is also found by linear interpolation.

Figure 2:
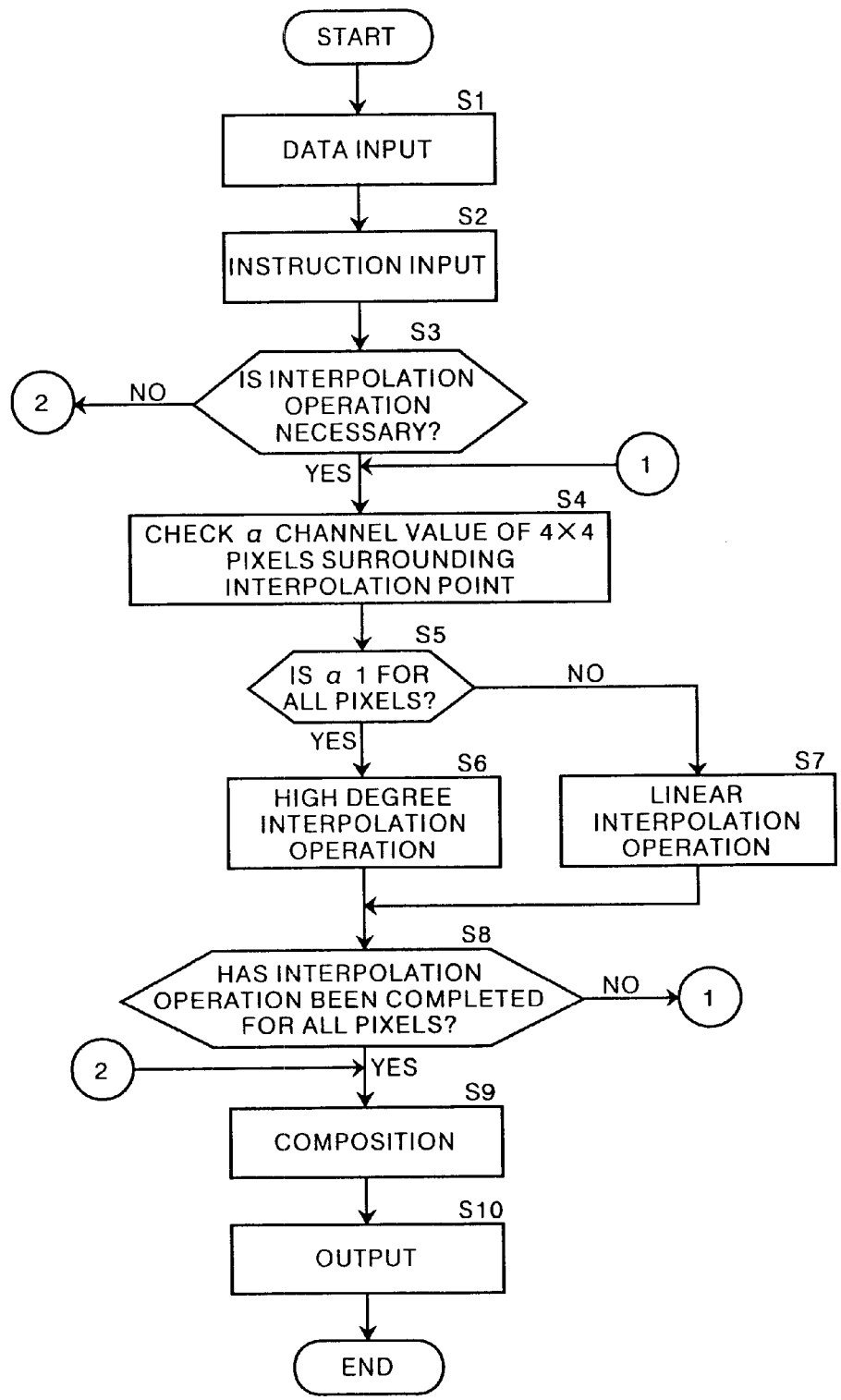
FIG. 2 is a flow chart showing an operation of the first embodiment.

An operation of the first embodiment will be explained next. FIG. 2 is a flow chart showing an operation of the first embodiment. The original image data S0 and the combining image data H0 are input by the image inputting means 1 and the combining image inputting means 2, respectively (Step 1). An instruction to compose the original image data S0 with the combining image data H0 is input from the instruction inputting means 3 (Step S2). The image composition controlling means 5 judges whether or not an interpolation operation on the original image data S0 is necessary, based on the instruction input from the instruction inputting means 3 (Step S3), checks the value of the α channel of the 4×4 pixels surrounding the interpolation point by using the judging means 7 (Step S4), and judges whether or not the value of the α channel is 1 for all pixels (Step S5). If Step S3 is negative, the procedure goes to Step S9 which will be explained later. If Step S5 is affirmative, the high degree interpolation operation means 8 carries out a high degree interpolation operation on the interpolation point (Step S6), while the linear interpolation operation means 9 carries out a linear interpolation operation on the interpolation point by using the pre-multiplied α method described above if Step S5 is negative (Step S7).

At Step S8, whether or not the interpolation operation is finished for all pixels is judged. If Step S8 is negative, the processing from Step S4 through Step S8 is repeated until the interpolation operation is finished for all pixels. When the interpolation operation is finished for all pixels and the interpolated image data S1 are obtained, Step S8 is affirmed and the interpolated image data S1 and the combining image data H0 are composed together to obtain the composite image data G0 (Step S9). The composite image data G0 obtained in this manner are output to a printer or a monitor or an external device such as a recording medium by the output means 6 (Step S10).

As has been described above, in the first embodiment, whether or not the value of the α channel is 1 for all 4×4 pixels surrounding the interpolation point, that is, whether or not the image in this area is completely opaque, is judged, and a high degree interpolation operation or a linear interpolation operation is carried out on the interpolation point if the judgment is affirmative or negative respectively. If a high degree interpolation operation is carried out, sharpness of the interpolated image can be improved than by a linear interpolation operation. Therefore, for a completely opaque area in the original image, an interpolated image having high sharpness can be obtained. Meanwhile, for an area which is not completely opaque, that is, for a transparent or semi-transparent area, a linear interpolation operation is carried out and no artifact due to over shoot or under shoot which would be caused by a high degree interpolation operation is created. Therefore, the interpolated image having no artifact and high sharpness can be obtained for the area where transparency changes. In this case, the image becomes blurry in the range where transparency changes. However, since image composition is carried out for the changing transparency area in such a manner that the image is blended into the mount, the blurry original image does not cause a visual problem.

By carrying out a linear interpolation operation using the pre-multiplied α method especially, the values of the original image data do not change unnaturally in the area where transparency changes, and the interpolated image having naturally changing transparency can be obtained.

Figure 3:
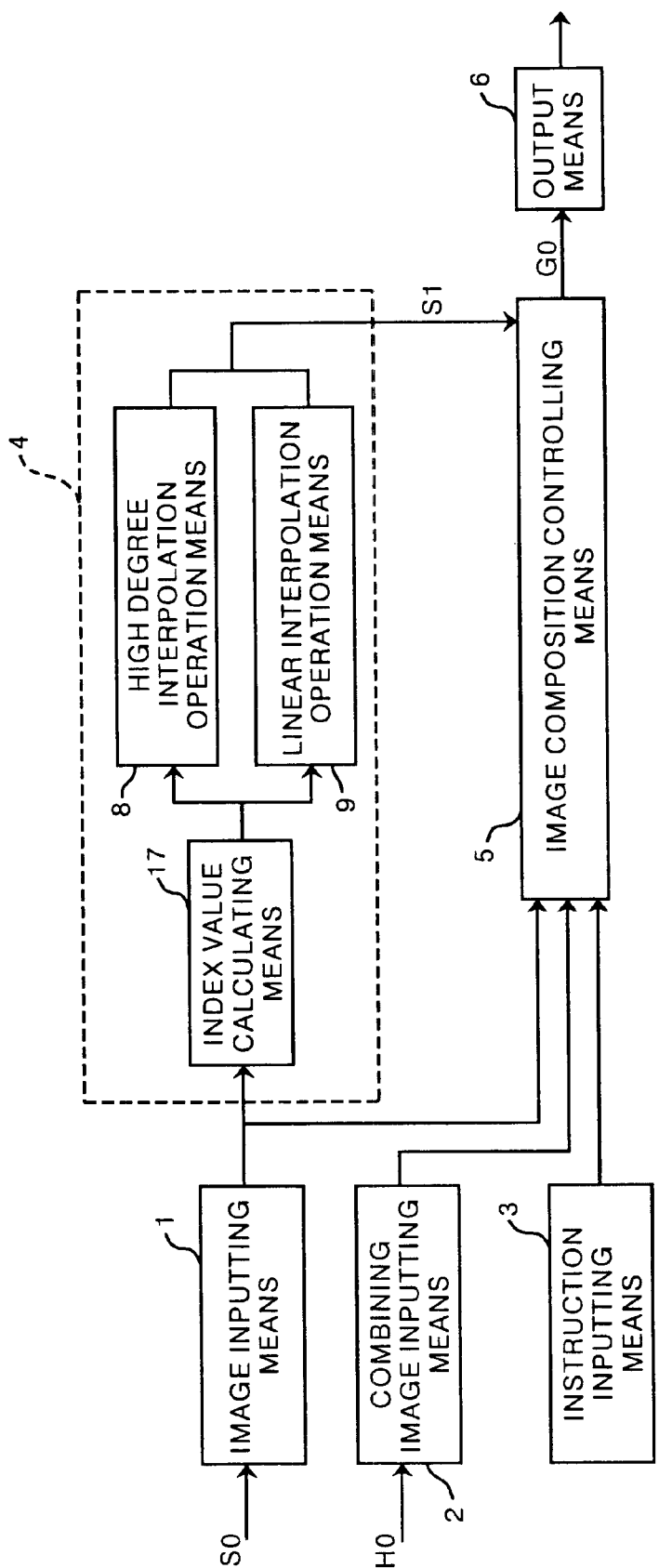
FIG. 3 is a block diagram showing an outline configuration of an image composing system adopting an interpolation operation apparatus according to a second embodiment of the present invention.

A second embodiment of the present invention will be explained next. FIG. 3 is a block diagram showing an outline configuration of an image composing system adopting an interpolation operation apparatus according to the second embodiment. In the second embodiment, components which are the same as in the first embodiment have the same reference numerals and detailed explanation thereof is not repeated. In the second embodiment, instead of the judging means 7 of the interpolation operation apparatus 4 in the first embodiment, index value calculating means 17 is used. The index value calculating means 17 calculates an index value indicating opaqueness of a predetermined area surrounding an interpolation point, based on the value of the α channel of the pixels therein. Based on the index value calculated by the index value calculating means 17, either a high degree interpolation operation is carried out by the high degree interpolation operation means 8 or a linear interpolation operation is carried out by the linear interpolation operation means 9.

The index value calculating means 17 finds out an averaged α value or a multiplied α value by averaging or multiplying the values of the α channel in the predetermined area of 4×4 pixels surrounding the interpolation point determined by the image composition controlling means 5, and finds the index value by truncating the averaged α value or the multiplied a value. The value of the α channel means complete opaqueness when it is 1 and complete transparency when it is 0. When the value is within a range of 0~1, the value indicates semi-transparency. Therefore, when the averaged or the multiplied α value is 1, the original image is completely opaque in the predetermined area while it is transparent or semi-transparent when the value is equal to or larger than 0 and smaller than 1. In this embodiment, the original image is completely opaque in the predetermined area when the index value is 1 while transparent or semi-transparent when the value is 0.

In the second embodiment, as in the first embodiment, the interpolated image data S1 are obtained by carrying out a high degree interpolation operation by the high degree interpolation operation means 8 on the interpolation point when the index value calculated by the index value calculating means 17 is 1, or by carrying out a linear interpolation operation using the pre-multiplied α method by the linear interpolation operation means 9 when the index value is 0.

As has been described above, in the second embodiment, the index value indicating opaqueness of the predetermined area surrounding the interpolation point is found based on the α channel value in the area, and a high degree interpolation operation is carried out on the interpolation point when the index value is 1 meaning the area is completely opaque, while a linear interpolation operation is carried out thereon when the index value is 0 meaning the area is transparent or semi-transparent. Therefore, as in the first embodiment, an interpolated image having high sharpness for the area of complete opaqueness in the original image and having no artifacts due to over shoot or under shoot in the area of transparency or semi-transparency can be obtained.

In the first and the second embodiments above, a judgment as to whether or not the value of the α channel is 0 for all 4×4 pixels surrounding the interpolation point, that is, whether or not the area is completely transparent, may be made by the judging means 7 or the index value calculating means 17. In this case, when the area is completely transparent, the image in the area is completely invisible and no interpolation may be carried out on the area.

Figure 4:
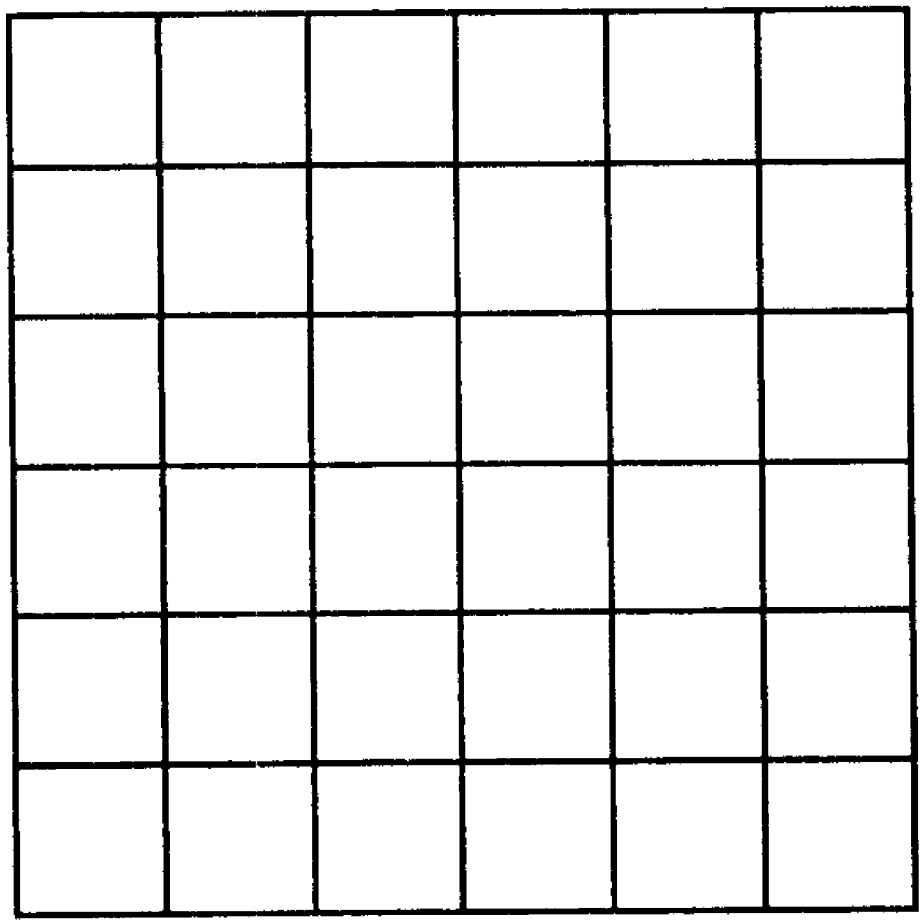
FIG. 4 is an illustration explaining labeling on an original image.

In the first embodiment, the value of the α channel is checked for all pixels surrounding the interpolation point. However, the value of the α channel of the pixels surrounding the interpolation point may be checked in advance for an entire image so that the area on which a high degree interpolation operation is carried out is distinguished from an area on which a linear interpolation operation is carried out. Depending on this distinction, the high degree interpolation operation and the linear interpolation operation are carried out. More specifically, the image represented by the original image data S0 is classified into 3 areas such as an area of high degree interpolation operation (area 1) due to the α channel value for all 4×4 pixels surrounding the interpolation point being 1, an area of no interpolation operation (area 2) due to the α channel value being 0 for all pixels meaning the original image is transparent, and an area of linear interpolation operation (area 3) due to the α channel value being in the range of 0~1, for example. Each area is labeled, and the interpolation operation is determined based on the label. In this case, as shown in FIG. 4, if pixels of the original image data S0 exist at intersection points of a grid, the label showing any one of the areas 1 to 3 is attached to the area surrounded by the grid. By judging the value of the label for an area including the interpolation point, any one of the high degree interpolation operation, the linear interpolation operation, and no interpolation operation is selected. In the second embodiment, the index value may also be calculated for the entire image, based on the value of the α channel surrounding the interpolation point so that the areas of high interpolation operation and linear interpolation operation can be distinguished.

In the first and the second embodiments described above, the value of the α channel of 4×4 pixels surrounding the interpolation point has been checked to change the interpolation operation. However, in the case where an interpolation operation with great accuracy is carried out, the area for checking the α channel value may be extended, such as 6×6 pixels or 8×8 pixels surrounding the interpolation point.

Figure 9:
FIG. 9 is another illustration explaining how the linearly interpolated pixels having the α channel are composed with the mount (part 2)
Figure 10:
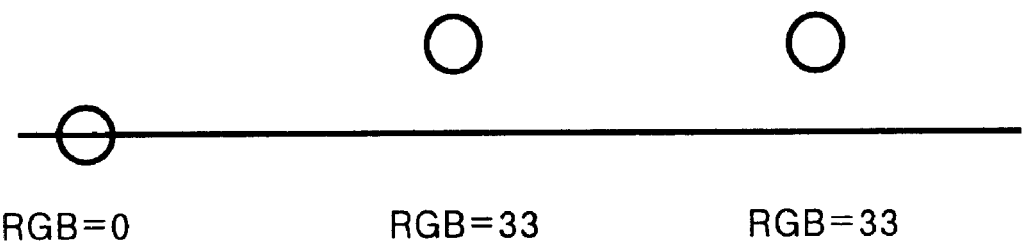
FIG. 10 is an illustration explaining the pre-multiplied α method (part 1)
Figure 11:
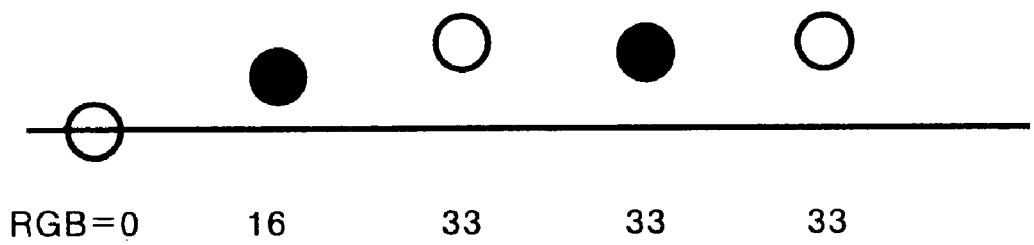
FIG. 11 is another illustration explaining the pre-multiplied α method (part 2).

In the first and the second embodiments above, a linear interpolation operation using the pre-multiplied α method is used. However, depending on an enlargement ratio, no white streak is generated in some cases at borders of transparency change unlike the case shown in FIG. 9, even if α is multiplied after a linear interpolation operation has been carried out thereon. Therefore, in such a case, a normal linear interpolation operation may be carried out instead of the pre-multiplied α method.

Furthermore, in the first and the second embodiments above, the original image data S0 comprise 4 channels, namely R, G, B and α. However, the original image data may include 4 channels comprising hue, saturation, lightness, and α.

Figure 5:
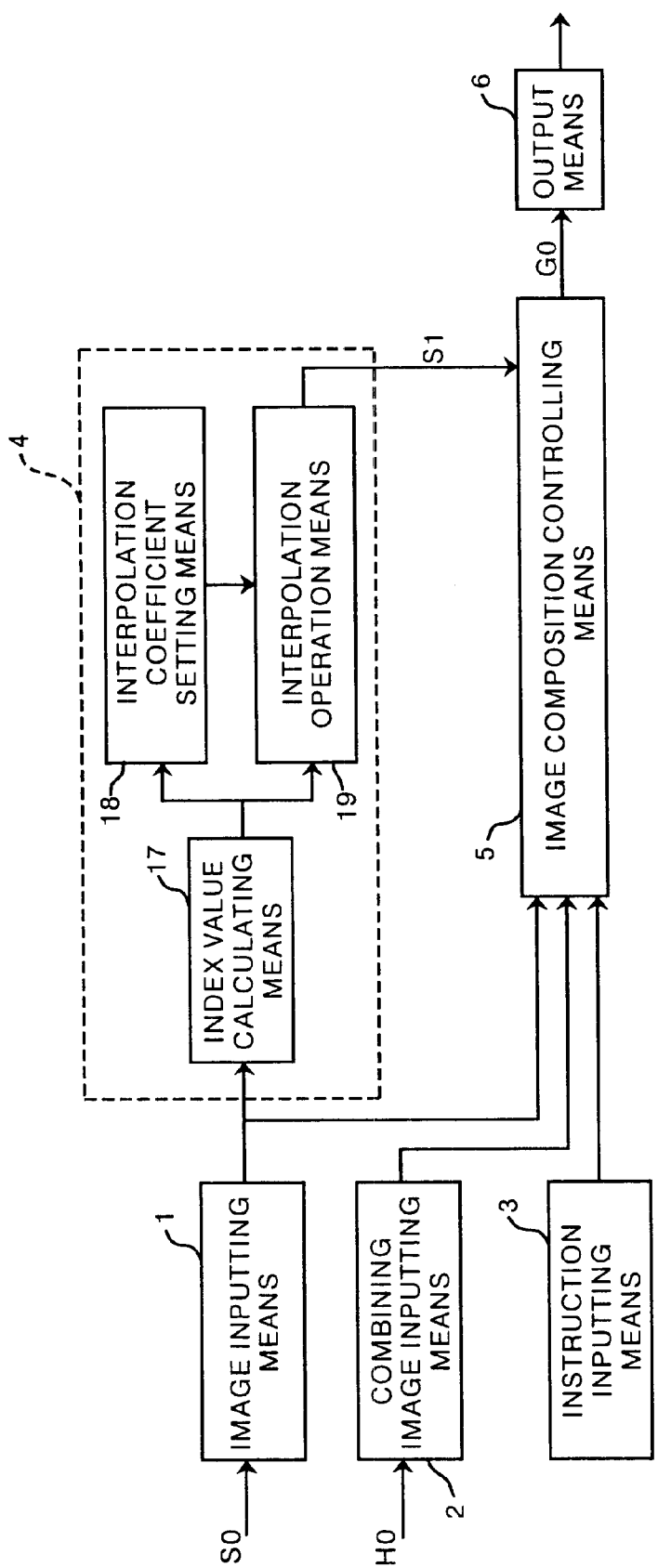
FIG. 5 is a block diagram showing an outline configuration of a modified image composing system adopting an interpolation operation apparatus according to the second embodiment of the present invention.
Figure 6:
FIG. 6 is an illustration explaining how pixels having the α channel are composed with a mount (part 1)
Figure 6:
Figure 6:
Figure 7:
FIG. 7 is another illustration explaining how the pixels having the α channel are composed with the mount (part 2)
Figure 7:
Figure 7:
Figure 8:
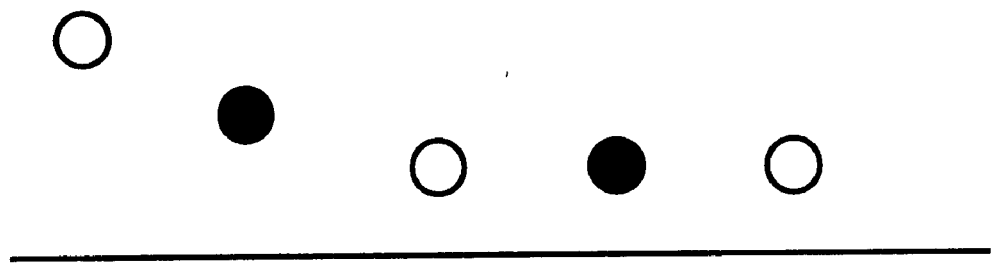
FIG. 8 is an illustration explaining how linearly interpolated pixels having the α channel are composed with a mount (part 1)

In the second embodiment, the interpolation operation is switched between the high degree interpolation and the linear interpolation, depending on the value of the α channel of the pixels surrounding the interpolation point. However, as shown in FIG. 5, the high degree interpolation operation means 8 and the linear interpolation operation means 9 may be replaced with interpolation coefficient setting means 18 for setting an interpolation coefficient based on the index value calculated by the index value calculating means 17 and interpolation operation means 19 for carrying out an interpolation operation based on the interpolation coefficient set by the interpolation operation coefficient setting means 18. In this case, in the interpolation coefficient setting means 18, interpolation operation coefficients Ki and Si for a high degree interpolation operation and a linear interpolation operation respectively are found in advance. Based on the index value calculated by the index value calculating means 17, an interpolation coefficient Wi for the interpolation point is found by using the following Equation (4):

$$Wi = t \times Ki + (1-t) \times Si \qquad (4)$$

where t is the index value. In the interpolation operation means 19, the interpolated image data S1 are obtained by carrying out the interpolation operation using the interpolation coefficient Wi set by the interpolation coefficient setting means 18 on the interpolation point.

What is claimed is:

1. An interpolation operation method of finding interpolated image data having pixel spacing different from pixel spacing of original image data by interpolating the original image data comprising pixels each having a channel representing transparency and channels representing color or density, the interpolation operation method comprising the steps of:

carrying out an interpolation operation on an interpolation point, the interpolation operation being different depending on the values of the channel representing transparency of all pixels in a predetermined area surrounding the interpolation point in the original image represented by the original image data, wherein the transparency, color and density channels have the same number of pixels and during the interpolation operation the transparency, color and density channels are either enlarged or reduced.

2. An interpolation operation method as claimed in claim 1, comprising the steps of:

judging whether or not the value of the channel representing transparency indicates complete opaqueness for all pixels in the predetermined area surrounding the interpolation point;

carrying out a high-degree interpolation operation on the interpolation point, based on the pixel values in the predetermined area, when the judgment result is affirmative; and carrying out a linear interpolation operation on the interpolation point, based on the pixel values in the predetermined area, when the judgment result is negative.

3. An interpolation operation method as claimed in claim 2, wherein the linear interpolation operation is carried out after multiplied pixel values are found by multiplying the values of each pixel in the predetermined area and the value of the channel representing transparency at the pixel.

4. An interpolation operation method as claimed in claim 1, comprising the steps of:

calculating an index value representing opaqueness of the predetermined area surrounding the interpolation point, based on the values of the channel representing transparency of all pixels therein;

carrying out a high degree interpolation operation on the interpolation point, based on the values of the pixels in the predetermined area, if the index value shows complete opaqueness; and carrying out a linear interpolation operation on the interpolation point, based on the values of the pixels in the predetermined area, if the index value shows a state other then complete opaqueness.

5. An interpolation operation method as claimed in claim 1, comprising the steps of:

calculating an index value indicating opaqueness of the predetermined area surrounding the interpolation point, based on the values of the channel representing transparency of all pixels in the predetermined area; and setting an interpolation coefficient used for carrying out an interpolation operation on the interpolation point, based on the calculated index value; and carrying out the interpolation operation based on the interpolation coefficient having been set.

6. An interpolation operation apparatus for finding interpolated image data having pixel spacing different from pixel spacing of original image data by interpolating the original image data comprising pixels each having a channel representing transparency and channels representing color or density, the interpolation operation apparatus comprising:

interpolation operation means for carrying out an interpolation operation on an interpolation point, the interpolation operation being different depending on the values of the channel representing transparency of all pixels in a predetermined area surrounding the interpolation point in an original image represented by the original image data, wherein the transparency, color and density channels have the same number of pixels and during the interpolation operation the transparency, color and density channels are either enlarged or reduced.

7. An interpolation operation apparatus as claimed in claim 6, wherein the interpolation operation means comprises:

judging means for judging whether or not the value of the channel representing transparency shows complete opaqueness for all pixels in the predetermined area surrounding the interpolation point;

high degree interpolation means for carrying out a high degree interpolation operation on the interpolation point, based on the values of the pixels in the predetermined area, if the judgment result obtained by the judging means is affirmative; and linear interpolation operation means for carrying out a linear interpolation operation on the interpolation point, based on the values of the pixels in the predetermined area, if the judgment result obtained by the judging means is negative.

8. An interpolation operation apparatus as claimed in claim 7, wherein the linear interpolation operation means carries out the interpolation operation after multiplied pixel values are obtained by multiplying the values of each pixel in the predetermined area and the value of the channel representing transparency at the pixel.

9. An interpolation operation apparatus as claimed in claim 6, wherein the interpolation operation means comprises:

index value calculating means for calculating an index value indicating opaqueness of the predetermined area surrounding the interpolation point, based on the values of the channel representing transparency of all pixels in the predetermined area;

high degree interpolation operation means for carrying out a high degree interpolation operation on the interpolation point, based on the values of the pixels in the predetermined area, if the index value indicates complete opaqueness; and linear operation interpolation means for carrying out a linear interpolation operation on the interpolation point, based on the values of the pixels in the predetermined area, if the index value shows a state other than complete opaqueness.

10. An interpolation operation apparatus as claimed in claim 6, wherein the interpolation operation means comprises:

index value calculating means for calculating an index value indicating opaqueness of the predetermined area for all pixels in the predetermined area surrounding the interpolation point, based on the value of the channel representing transparency; and interpolation coefficient setting means for setting an interpolation coefficient for an interpolation operation to be carried out on the interpolation point, based on the index value calculated by the index value calculating means, and the interpolation operation means carries out the interpolation operation based on the interpolation coefficient having been set.

11. A computer-readable recording medium storing a program to cause a computer to execute an interpolation operation method of finding interpolated image data having pixel spacing different from pixel spacing of original image data by interpolating the original image data comprising pixels each having a channel representing transparency and channels representing color or density, the program comprising the procedure of:

carrying out an interpolation operation on an interpolation point, the interpolation operation being different depending on the values of the channel representing transparency of all pixels in a predetermined area surrounding the interpolation point in the original image represented by the original image data, wherein the transparency, color and density channels have the same number of pixels and during the interpolation operation the transparency, color and density channels are either enlarged or reduced.

12. A computer-readable recording medium as claimed in claim 11, the procedure of carrying out an interpolation operation comprising the procedures of:

judging whether or not the value of the channel representing transparency indicates complete opaqueness for all pixels in the predetermined area surrounding the interpolation point;

carrying out a high degree interpolation operation on the interpolation point, based on the pixel values in the predetermined area, when the judgment result is affirmative; and carrying out a linear interpolation operation on the interpolation point, based on the pixel values in the predetermined area, when the judgment result is negative.

13. A computer-readable recording medium as claimed in claim 12, wherein the procedure of carrying out a linear interpolation operation is a procedure of carrying out a linear interpolation operation after multiplied pixel values are found by multiplying the values of each pixel in the predetermined area and the value of the channel representing transparency at the pixel.

14. A computer-readable recording medium as claimed in claim 11, the procedure of carrying out an interpolation operation comprising the procedures of:

calculating an index value representing opaqueness of the predetermined area surrounding the interpolation point, based on the values of the channel representing transparency of all pixels therein;

carrying out a high degree interpolation operation on the interpolation point, based on the values of the pixels in the predetermined area, if the index value shows complete opaqueness; and carrying out a linear interpolation operation on the interpolation point, based on the values of the pixels in the predetermined area, if the index value shows a state other then complete opaqueness.

15. A computer-readable recording medium as claimed in claim 11, the procedure of carrying out an interpolation operation comprising the procedures of:

calculating an index value indicating opaqueness of the predetermined area surrounding the interpolation point, based on the values of the channel representing transparency of all pixels in the predetermined area;

setting an interpolation coefficient used for carrying out an interpolation operation on the interpolation point, based on the calculated index value; and carrying out the interpolation operation based on the interpolation coefficient having been set.

\* \* \* \* \*